US00RE43033E

(19) United States
(12) Reissued Patent
James et al.

(10) Patent Number: US RE43,033 E
(45) Date of Reissued Patent: Dec. 20, 2011

(54) FILM SIDE SEALING APPARATUS WITH CLOSED-LOOP TEMPERATURE CONTROL OF A HEATER

(75) Inventors: Frank A. James, Nashua, NH (US); Jeffrey C. Lindberg, Merrimack, NH (US); Charles Manfredi, Manchester, NH (US); Richard Davitt, Princeton, NJ (US)

(73) Assignee: Shrink Packaging Systems Corporation, Nashua, NH (US)

(21) Appl. No.: 12/378,967

(22) Filed: Feb. 20, 2009

Related U.S. Patent Documents

Reissue of:
(64) Patent No.: 7,281,362
Issued: Oct. 16, 2007
Appl. No.: 10/994,691
Filed: Nov. 22, 2004

(51) Int. Cl.
*B65B 51/10* (2006.01)
*B65B 7/02* (2006.01)

(52) U.S. Cl. ..... 53/479; 53/460; 53/374.3; 53/373.7

(58) Field of Classification Search ..... 53/463, 53/479, 477, 370.7, 373.7, 375.9, 374.3, 53/374.4
See application file for complete search history.

(56) References Cited

U.S. PATENT DOCUMENTS

| | | | | |
|---|---|---|---|---|
| 2,240,735 | A | | 5/1941 | Yelm et al. |
| 3,565,086 | A | | 2/1971 | Zimmerman |
| 3,659,472 | A | | 5/1972 | Engels |
| 3,665,673 | A | * | 5/1972 | Billett et al. ..... 53/441 |
| 4,106,654 | A | | 8/1978 | Jones |
| 4,145,039 | A | | 3/1979 | Carlsson |
| 4,171,605 | A | | 10/1979 | Putnam, Jr. et al. |
| 4,219,988 | A | * | 9/1980 | Shanklin et al. ..... 53/550 |
| 4,282,424 | A | | 8/1981 | Hirose |
| 4,380,446 | A | | 4/1983 | Dickson et al. |
| 4,506,488 | A | * | 3/1985 | Matt et al. ..... 53/55 |
| 4,525,977 | A | * | 7/1985 | Matt ..... 53/55 |
| 4,574,566 | A | * | 3/1986 | Eaves et al. ..... 53/450 |
| 4,612,760 | A | | 9/1986 | Wolf et al. |
| 4,613,746 | A | * | 9/1986 | MacLaughlin ..... 219/490 |
| 4,722,168 | A | * | 2/1988 | Heaney ..... 53/450 |
| 4,768,885 | A | * | 9/1988 | Maier ..... 374/1 |
| 5,082,103 | A | | 1/1992 | Ross et al. |
| 5,165,221 | A | | 11/1992 | Udelson et al. |
| 5,590,878 | A | | 1/1997 | Takemoto et al. |
| 5,784,874 | A | | 7/1998 | Bruyneel et al. |
| 6,526,728 | B1 | | 3/2003 | Sorenson et al. |
| 7,281,362 | B2 | | 10/2007 | James et al. |

* cited by examiner

*Primary Examiner* — Rinaldi I. Rada
*Assistant Examiner* — John Paradiso
(74) *Attorney, Agent, or Firm* — Hayes Soloway P.C.

(57) ABSTRACT

A side sealing apparatus for a shrink packaging machine comprising closed loop temperature control of a heater for maintaining an optimum temperature for cutting and sealing two layers of thermoplastic film. The heater comprises a cable or cartridge heater with an internal thermocouple, and it is connected to an automatic temperature controller. The heater is mounted on the side sealer apparatus between two sets of top and bottom V-belts mounted around drive rolls and idler rolls. The V-belts provide nip pressure against the film in order to drive the film. Nip pressure is generated by nip rolls on the scrap side of the film, and by belt support plates on the package side of the film.

9 Claims, 7 Drawing Sheets

FILM SIDE SEALING APPARATUS WITH CLOSED-LOOP TEMPERATURE CONTROL OF A HEATER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to a side sealer of thermoplastic film around a dimensioned article, and in particular to a side sealing apparatus having an internally heated sealing bar integrated with a closed-loop temperature controller operating essentially in free air supported by thin clips in order to minimize heat transfer to the overall assembly, allowing the heater to cut and seal a thermoplastic film in as tight a temperature range as possible, while allowing the overall temperature of the entire unit to operate at close to room temperature.

2. Description of Related Art

A commonly used side sealer of thermoplastic film in shrink wrapping machines comprises dual hot wires. The hot wires are typically two (2) eight inch heated nichrome wires mounted parallel, one on top of the other. The wires are separated by a gap of approximately 0.010 inches to 0.015 inches (the thickness of an average business card). Adjusting and maintaining this gap is critical for proper sealing and cutting of the film web as this film is cut and sealed by radiant heat from the opposing wires. The wires utilized in this arrangement must be installed completely flat against the backing material, in this case, 1 inch long ceramic "beads" or blocks. No bowing or slight kinks in the wires can be tolerated as a uniform gap must be maintained. Access to these wires requires removal of cover plates and film drive belts. Frequent cleaning of resin buildup is necessary. Cleaning the wires without disturbing the gap setting or flatness of the wire is very difficult. Readjustment of the gap is usually necessary. All of this results in lost production time.

Further, the performance of the dual side sealer is often not stable over extended periods of operation even when initially adjusted to optimum settings. A significant cause of this instability is the drift in wire temperatures over time due to drifts in power conditions typical in many factories. The wire temperature is subject to open loop control, i.e. any changes in factory power feed conditions or operating conditions will cause the wire temperature to change, and conversely, will require an operator to manually adjust the electrical power values to the wire power feed in order to bring the wire temperature back to the desired sealing temperature. Another inherent problem with the dual wire side sealer is the fact that many side sealer components heat up to undesirably high temperatures during operation of the side sealer as a result of the sealing wires radiating heat and its mounting being in contact with the frame they are mounted on which conducts heat to the main assembly resulting in resin build-up during production runs. The heat build-up is detrimental to successful side sealing requiring frequent stopping of the machine in order to clean the molten film build-up on the individual wire assemblies. The resin build-up is a result of unintentional heating of the area of the film that is close to, but outside of, the actual seal area. This unintentionally heated film becomes soft and is prone to stick to components that it contacts, particularly if the side sealer frame components are already at an elevated temperature. In addition, the dual wire side sealer has a large parts count, and coupled with the fact that it operates at an overall elevated temperature, the side sealer belts and bearings are subject to frequent failure, resulting in attendant high maintenance costs. In addition, when the dual wire sealer is inoperable for any reason, it requires sufficient time to cool down in order to restore its operation due to the excessive operating temperature of the entire unit, which frequently reaches temperatures of 135 degrees F. A typical cleaning and resetting will take at least 1½ hours, resulting in lost production for that period of time.

Prior art patents include U.S. Pat. No. 6,526,728 issued Mar. 4, 2003 to Gregg R. Sorenson et al. and assigned to Conflex Incorporated of Milwaukee, Wis. discloses a thermoplastic film side sealing mechanism comprising a hot wire assembly having a hot wire mounted between a stationary mounting block and a pivoting mounting block. The hot wire also diverges at an angle which is about 0.32 inches over an 8.125 inch run. The divergence is at an angle relative to the path of forwardly disposed belts. The pivoting mounting block provides for releasing tension of the wire to allow quick and easy removal of the wire ends from the assembly clamps. However, there is no closed loop control of the temperature of the hot wire and resin build-up occurs requiring frequent maintenance.

SUMMARY OF THE INVENTION

Accordingly, it is therefore an object of this invention to provide a closed ioop temperature controller for precise temperature control of a heater that directly contacts the film to cut and seal on a side sealer, and the heater operates in free air resulting in minimal heating of other components.

It is another object of this invention to provide a heat source that closely approximates an ideal sealing temperature of a particular thermoplastic film with a given thickness, and the heat source that cuts the film will operate at precisely the ideal temperature so as to produce consistent film strength seals with no residue and pleasing aesthetics with a wide range of thermoplastic materials, which is not possible with present technology.

It is another object of this invention to provide a simplified side sealer of thermoplastic film by attaching a temperature controlled heater having an internal or external thermocouple in the path of the film for sealing the film on a side of a product that requires no adjustment other than setting the required temperature for sealing a particular film type and gauge at a specific speed.

It is a further object of this invention to provide a method for sealing a thermoplastic film covering a product by using an elongated heater attached to a closed loop temperature controller and mounting the heater at an angle in the path of the edges of the film to be sealed.

These and other objects are further accomplished by a side sealer apparatus for cutting and sealing together two layers of film near edges of heat-sealable material comprising means for moving the heat sealable material through the side sealer apparatus, means, attached to the side sealer in the path of heat-sealable material, for generating heat to cut and seal the heat-sealable material near the edges, and means connected to the heat generating means for providing closed loop control of the heat generating means in accordance with a predetermined heat setting. The heat-sealable material comprises a thermoplastic film. The heat generating means comprises an elongated metal sheathed body having an internal heating mechanism, a thermocouple, and controller in a closed loop connected to a separate power source. The moving means comprises a conveyor. The apparatus comprises a top drive roll spaced-apart from a top idler roll, a bottom drive roll spaced-apart from a bottom idler roll and positioned immediately under the top drive roll and top idler roll respectively, a first pair of spaced-apart V-belts positioned around and between the top drive roll and the top idler roll, a second pair of spaced-apart V-belts positioned around and between the bottom driver roll and the bottom idler roll, and the heat generating means being mounted on the side sealer apparatus at a predetermined angle relative to horizontal between the V-belts positioned on an inner side of the heater and the V-belts positioned on an outer side of the heater.

The objects are further accomplished by a method for cutting and sealing the film layers together near an edge of heat-sealable material by a side sealing apparatus comprising the steps of moving the heat sealable material in contact with the side sealer apparatus, generating heat to cut and seal near the edge of sealable material with means attached to the side sealer in the path of the heat-sealable material, and providing closed loop control of the heat generating means in accordance with a predetermined heat setting with means connected to the heat generating means. The step of moving the heat-sealable material in contact with the side sealer comprises the step of providing thermoplastic film for the heat-sealable material. The step of generating heat to cut and seal the film near the edge of sealable material comprises the step of providing an elongated metal sheathed body having an internal heating mechanism and a thermocouple. The step of moving the heat sealable material in contact with the side sealer apparatus comprises the step of providing a conveyor. The method comprises the steps of providing a top drive roll spaced-apart from a top idler roll, providing a bottom drive roll spaced-apart from a bottom idler roll and positioned immediately under the top drive roll and top idler roll respectively, positioning a first pair of spaced-apart V-belts around and between the top drive roll and the top idler roll, positioning a second pair of spaced-apart V-belts around and between the bottom driver roll and the bottom idler roll, and mounting the heat generating means on the side sealer apparatus at a predetermined angle relative to horizontal between the V-belts positioned on an inner side of the heater and the V-belts positioned on an outer side of the heater.

The objects are further accomplished by a side sealer system comprising a roll of thermoplastic film, a thermoplastic film inverting head for redirecting the film 90 degrees and turning it inside out, a conveyor passing by the film inverting head for moving a product within the thermoplastic film, a side sealer apparatus located along a side of the conveyor and adjacent to the film inverting head, and the side sealer apparatus comprises a heater having a closed loop temperature controller for cutting and sealing near an edge of the film.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
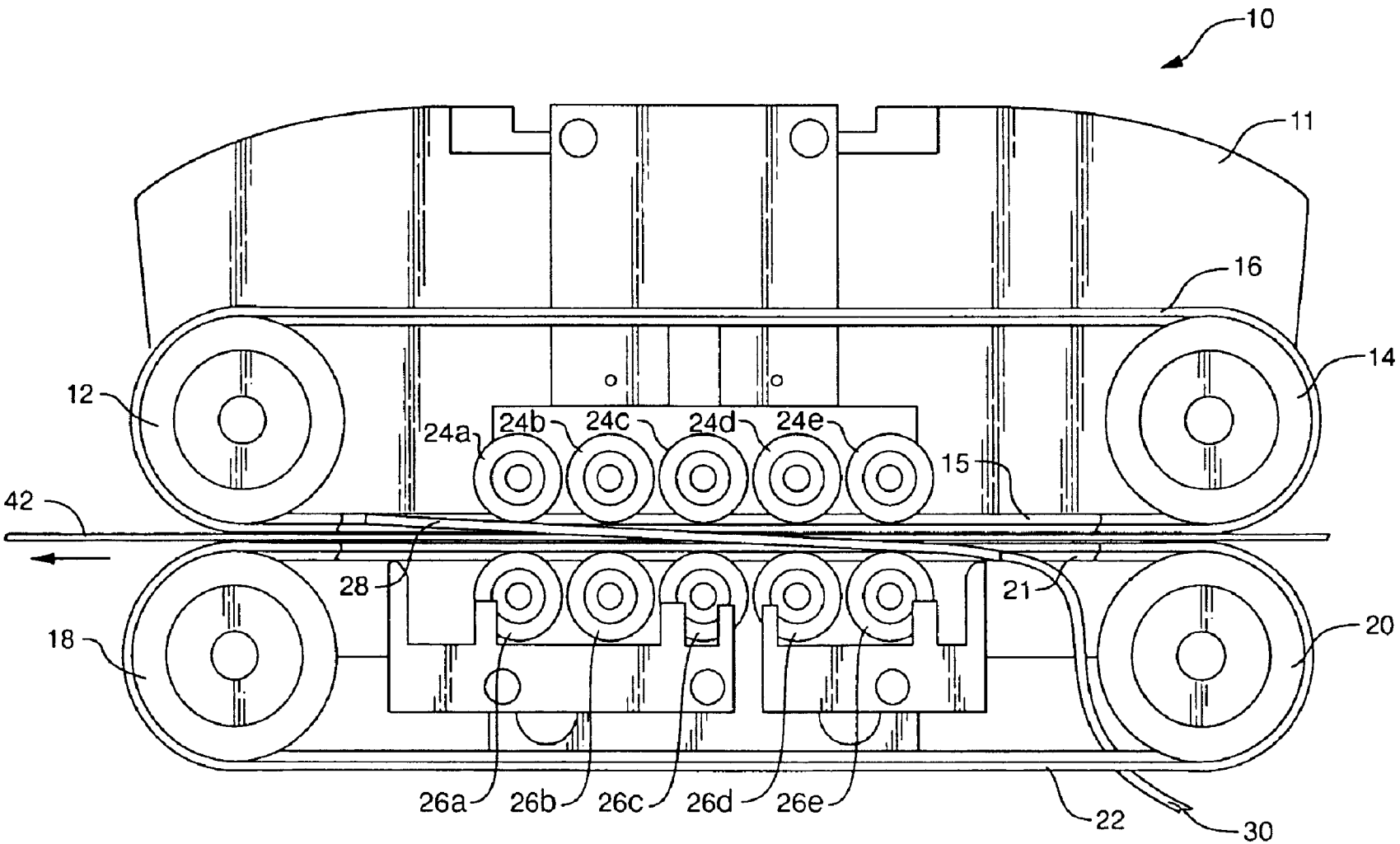
FIG. 1 is a front elevational view of a side sealer according to the present invention.
Figure 2:
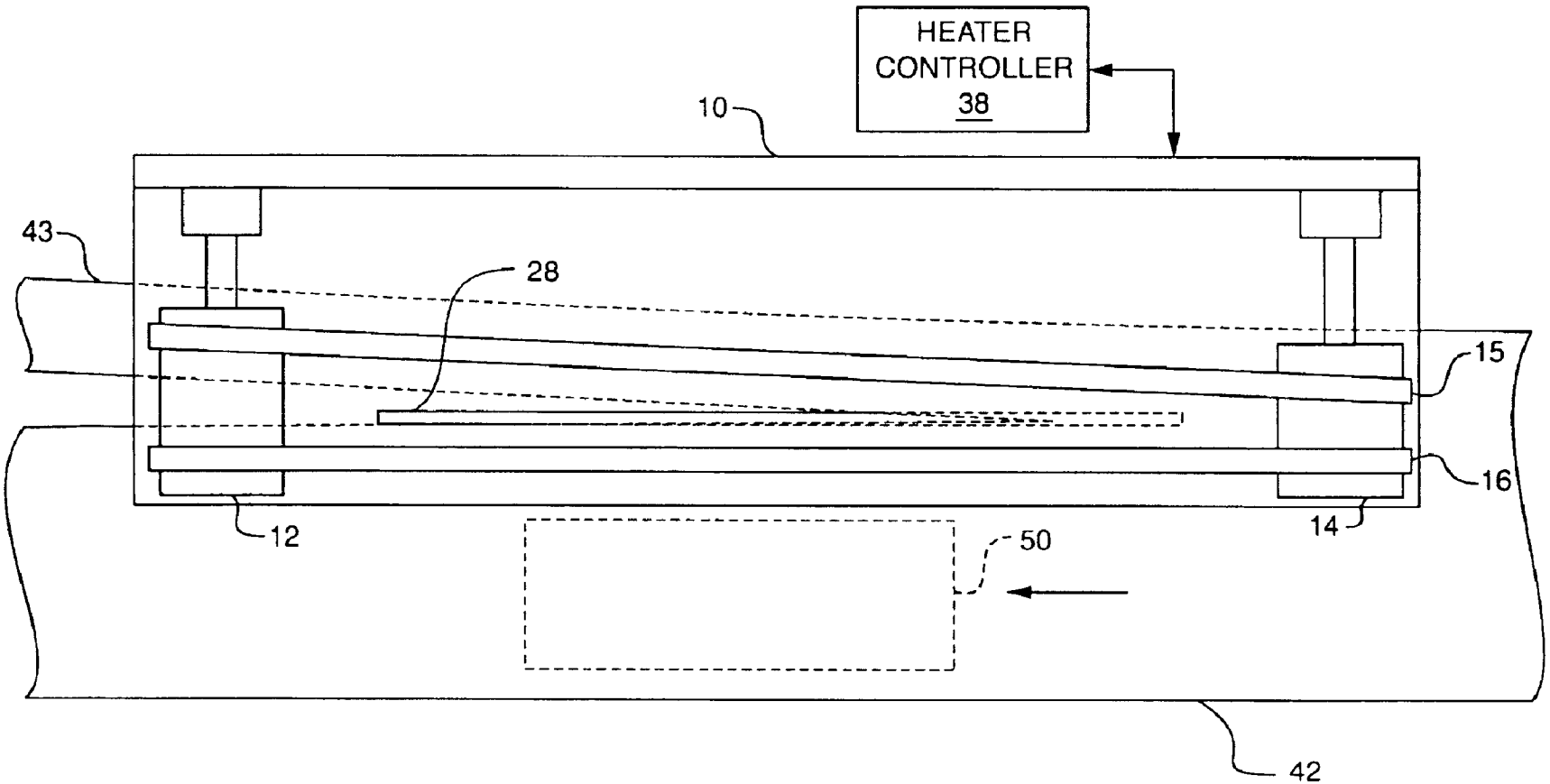
FIG. 2 is a top view of the side sealer of FIG. 1 showing scrap film separating after the film edges pass through a heater.
Figure 6:
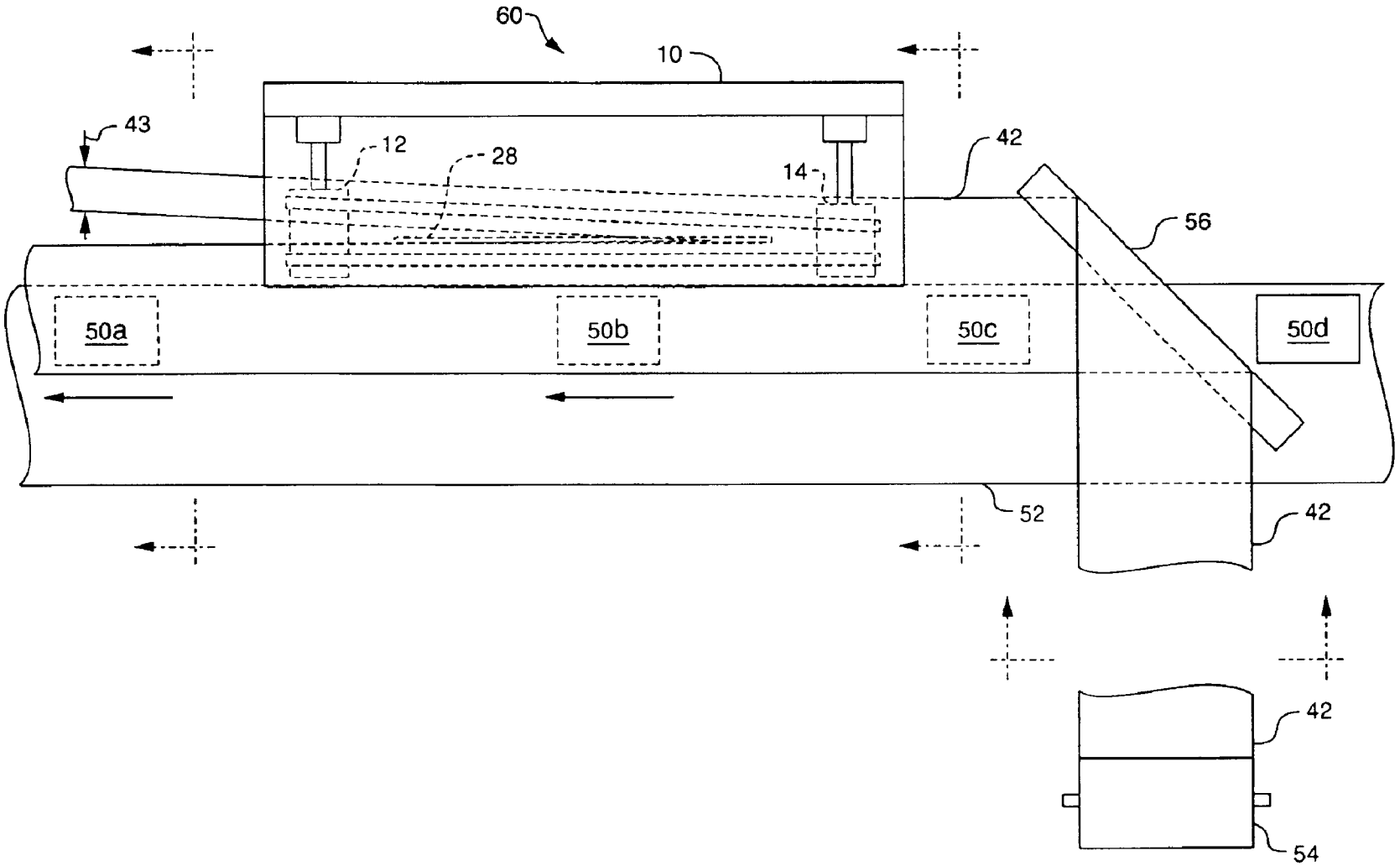
FIG. 6 is a top view of a side sealer system showing the method of film wrapping.

Referring to FIG. 1 and FIG. 2, FIG. 1 is a front elevational view of a side sealer 10 according to the invention with belt support plates removed, and FIG. 2 is a top view of the side sealer 10 shown in FIG. 1. The side sealer 10 performs a cutting and sealing operation near edges of a thermoplastic film 42 covering a package 50 using a heater 28. The side sealer 10 comprises a top drive roll 12 and a bottom drive roll 18, a top idler roll 14 and a bottom idler roll 20. There are two sets of V-belts that drive a film 42 to be sealed along a conveyor 52 (FIG. 6) through the side sealer 10. A top set includes two upper V-belts 15, 16 which are positioned around and between top driver roll 12 and the idler roll 14. A bottom set includes two lower V-belts 21, 22 which are positioned around and between the bottom drive roll 18 and the bottom idler roll 20. The heater 28 is mounted to the side sealer between the inner package side top and bottom belts 16 and 22 and the scrap side top and bottom belts 15 and 22, and the heater 28 is positioned on an angle of approximately two degrees relative to horizontal so that it intersects the path of the film 42. The top and bottom belts 16 and 22 are on the package side and oriented between the drive roll 12 and the idler roll 14 parallel to the conveyor, while the top and bottom belts 15 and 21 on the scrap side of the film 42 are angled away from the conveyor 52. The heater 28 is controlled by heater controller 38.

The side sealer 10 comprises an upper series of nip rolls 24a-24e and a lower series of nip rolls 26a-26e mounted directly under the upper series of nip rolls 24a-24e. The V-belts need to exert a "nip" pressure against the film 42 in order to drive the film 42. The nip rolls 24a-24e and 26a-26e are used to generate the nip pressure on the top and bottom scrape side V-belts 16 and 21. However, belt support plates 25, 27 (FIG. 4) are used to generate nip pressure between the top and bottom V-belts 16, 22 on the package side. For example, a top belt support plate 25 is manually pushed downward to create the nip force before the top belt support plate 25 is screwed into place.

Figure 3:
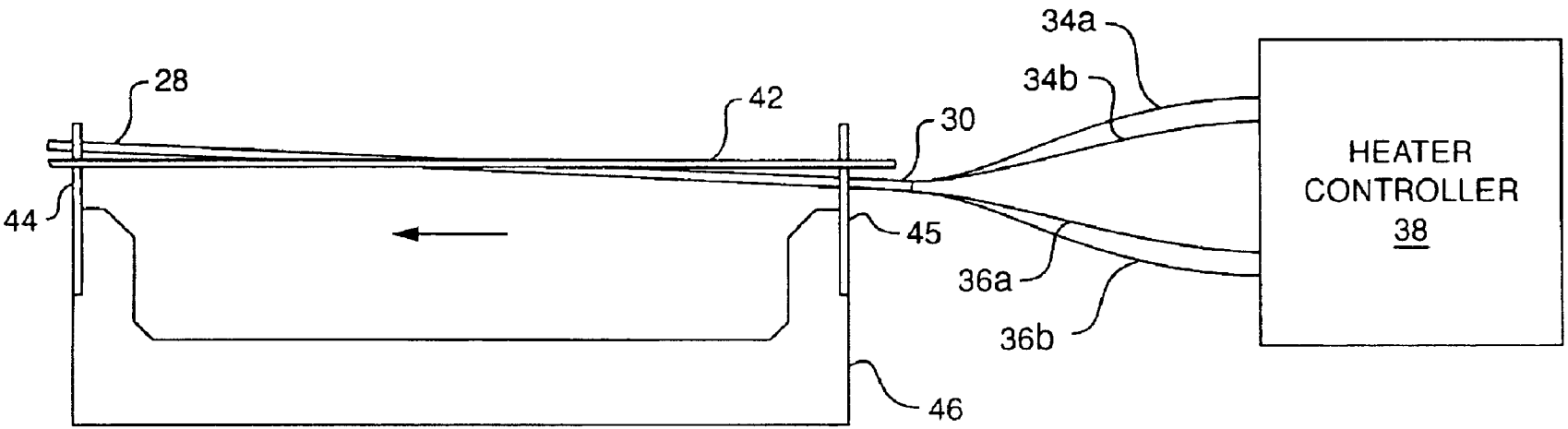
FIG. 3 is a diagram of a side sealer having a heater connected to a closed loop controller for setting and maintaining the temperature of the heater.

Referring now to FIG. 3, a diagram of the heater controller 38 connected to the heater 28 by a cable 30 is illustrated for setting and maintaining the temperature of the heater 28. The heater controller 38 comprises a closed loop temperature controller which maintains a predetermined set temperature to within less than one percent. The closed-loop controller may be embodied by temperature control Model 93 manufactured by Watlo of St. Louis, Mo. 63146. The heater 28 comprises a metal sheathed body with resistive internal electrical wiring as a preferred embodiment. The heater 28 is attached to the side sealer 10 by heater brackets 44, 45 which are mounted on a heater frame 46. The heater brackets 44, 45 are the only components to touch the heater 28.

When an electrical current is applied to the heater 28 via wires 34a, 34b, the internal mechanism generates heat that is efficiently transferred to the metal sheath of the heater 28. By varying the electrical power to the heater 28, the temperature of the heater 28 can be increased or decreased. The heater replaces pairs of nichrome resistive wires used in prior art open loop dual wire systems. It also replaces other methods of cutting and sealing of films on side sealer equipment. In operation the two layers of the film 42 that are to be cut and sealed together are guided into intimate and precise contact with the heater 28. Heat is efficiently transferred from the heater 28 to the film 42 producing a strong, consistent seal.

Still referring to FIG. 3, the thermocouple is embedded within the sheath of the heater 28, as a preferred embodiment. Alternatively, a thermocouple external to the heater can be positioned in close proximity to the heater. The thermocouple generates an electrical signal that is proportional to the temperature of the heater 28. The thermocouple signal is carried via wires 36a, 36b to heater controller 38 for closed loop control of the temperature of heater 28. The operation of the closed loop control system embodied by the heater controller 38 and the heater 28 is as follows: an operator inputs a predetermined temperature to the heater controller 38. The predetermined value is based on previous experience and in general, depends on film type, thickness, and the conveyor 52 speed. The heater controller 38 receives a signal from the thermocouple in the heater 28 on a continuous basis. The heater controller 38 has circuitry/logic that compares the actual temperature of the heater 28 (based on thermocouple signal) to the predetermined set temperature. If the actual temperature of the heater 28 is different than the set temperature, the controller adjusts the electric power level to the heater 28 to cause the actual temperature of the heater 28 to converge towards the set temperature. This process of the heater controller 38 comparing actual heater temperatures to set temperature occurs on a continuous, real time basis. Thus, once the operator inputs the set temperature to the heater controller 38, the heater temperature will be maintained at the set temperature within a close range or tolerance of less than one percent without any further operator intervention, regardless of any fluctuating incoming voltage. The heater controller 38 makes any adjustments required in response to any changes in operational conditions on an automatic basis. The heater 28 may be embodied by Cable Heater Part # 125FH014AX-1992 manufactured by Watlo Corporation of St. Louis, Mo. 63146. The heater controller 38 may be embodied by Temperature Controller Model #93AA-1CD0-00RG manufactured by Watlo Corporation of St. Louis, Mo. 63146.

Figure 4:
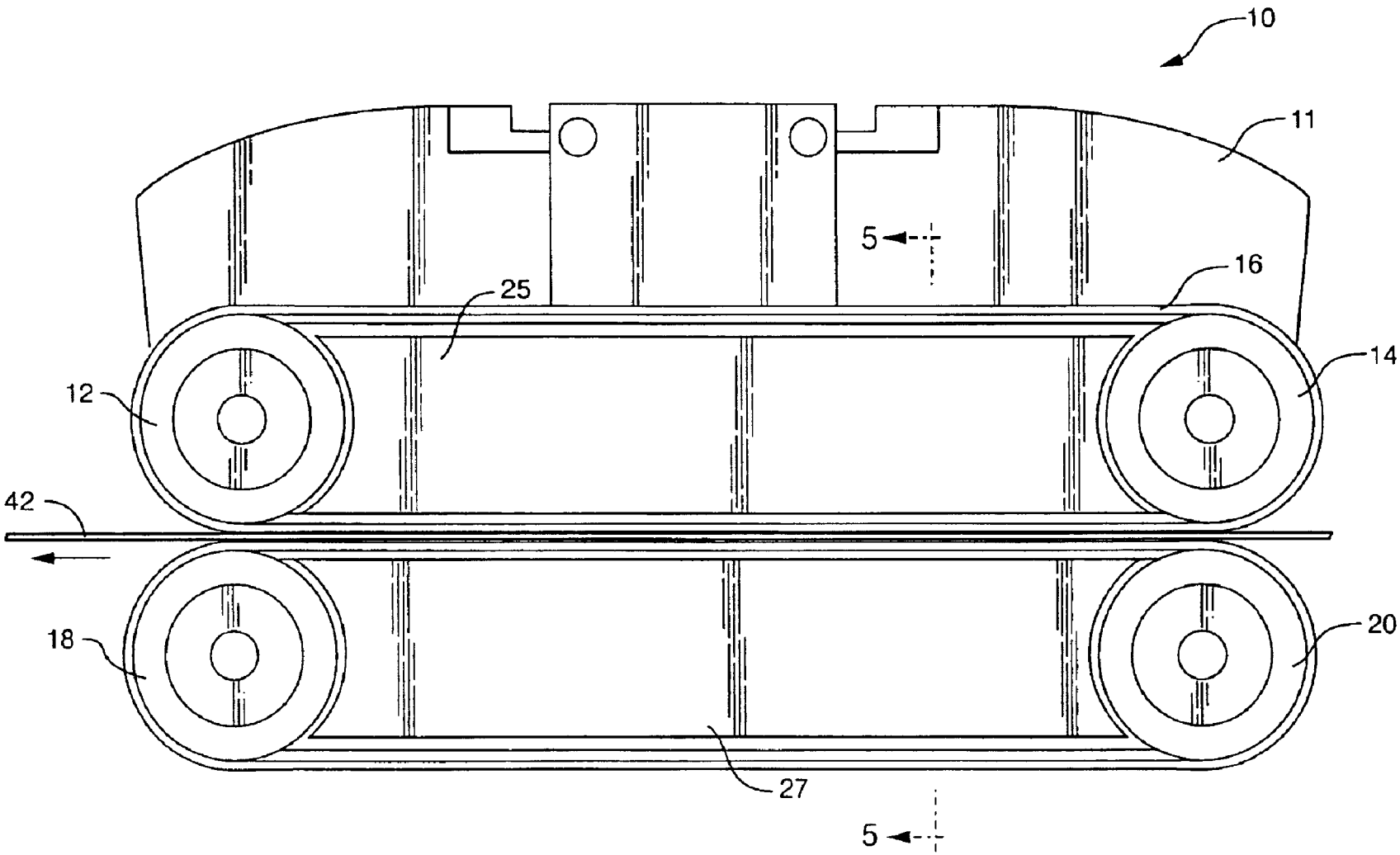
FIG. 4 is a front elevational view of the side sealer of FIG. 1 having top and bottom belt support plates attached.
Figure 5:
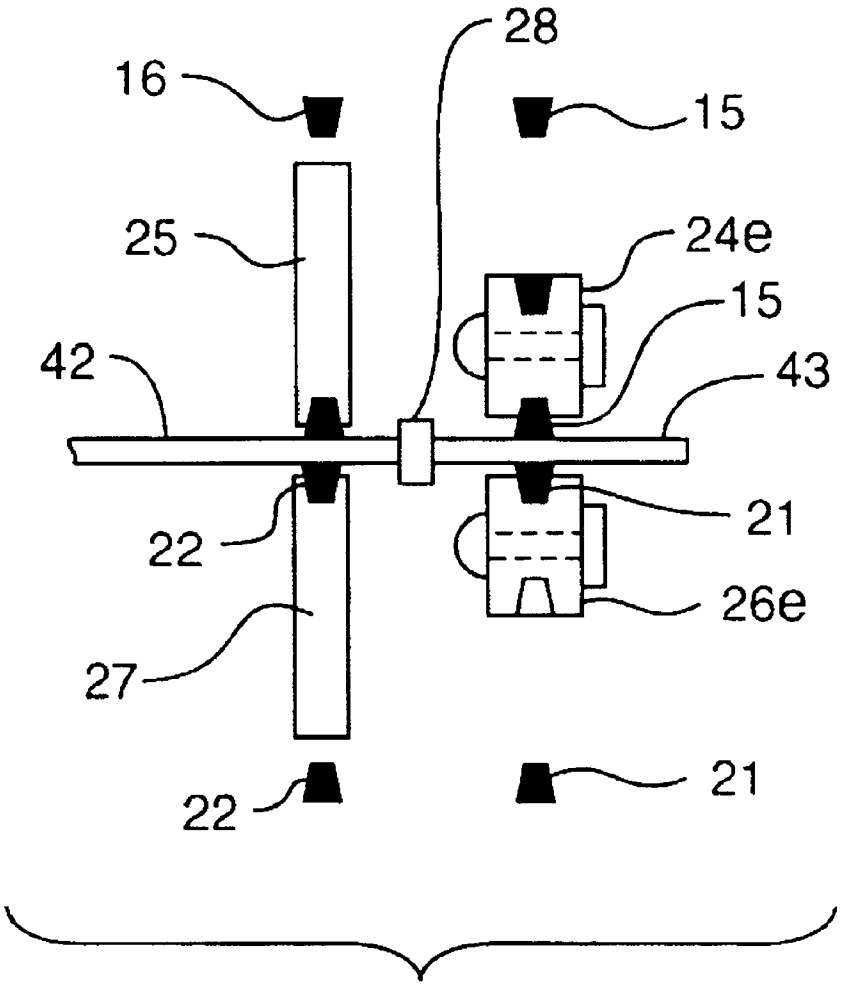
FIG. 5 is a fragmentary cross-section taken along lines 5-5 of FIG. 4 showing top and bottom belt support plates positioned for contact with V-belts on a package side.

Referring to FIG. 4 and FIG. 5, FIG. 4 is a front elevational view of the side sealer 10 of FIG. 1 according to the present invention showing the top belt support plate 25 and the bottom belt support plate 27 attached to the side sealer 10 which provide the nip pressure on the top and bottom V-belts 16 and 22. FIG. 5 is a fragmentary cross-section taken along lines 5-5 of FIG. 4 showing the top belt support plates 25 in contact with the lower portion of top V-belt 16 and the bottom belt support plate 27 in contact with the upper portion of bottom V-belt 22 to provide the nip pressure on the package side film drive belts 16, 22.

Referring to FIG. 6 and FIGS. 7A-7D, FIG. 6 is a top view of a side sealer 60 showing the method of performing the side sealing operation with the thermoplastic film 42 covering the product 50a-50d. FIGS. 7A-7D show the approximate appearance of the thermoplastic film 42 at various stages in the process. The side sealer system 60 comprises a conveyor 52 which moves the product 50a-50d onto the film 42 from right to left as indicated by arrow 61, and moves the product 50a-50d along the side sealer 10 for cutting and sealing of the film 42. The film 42 comes off a roll 54 and is opened by a film inverting head 56 having an upper arm 62 and a lower arm 64, or in other cases, a film inverting head in which the upper arm 62 and lower arm 64 are manufactured as a single piece.

Figure 7A:
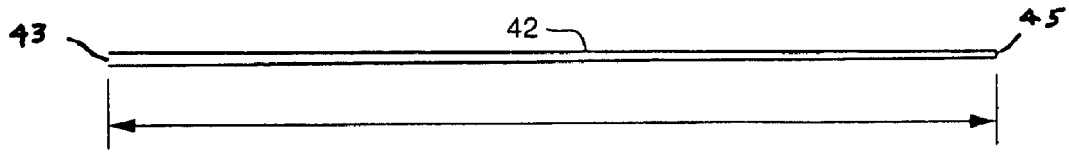
FIG. 7A is an end view of a folded film as it comes off a film roll.
Figure 7B:
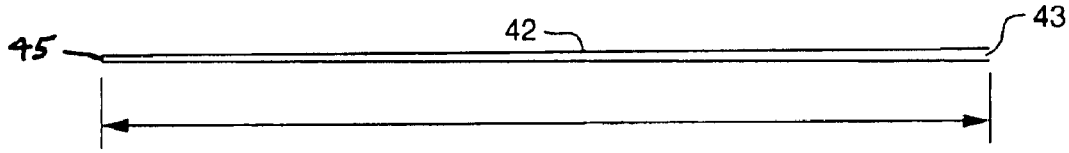
FIG. 7B is an end view of the folded film with open edges before side sealing and after it has been inverted.
Figure 7C:
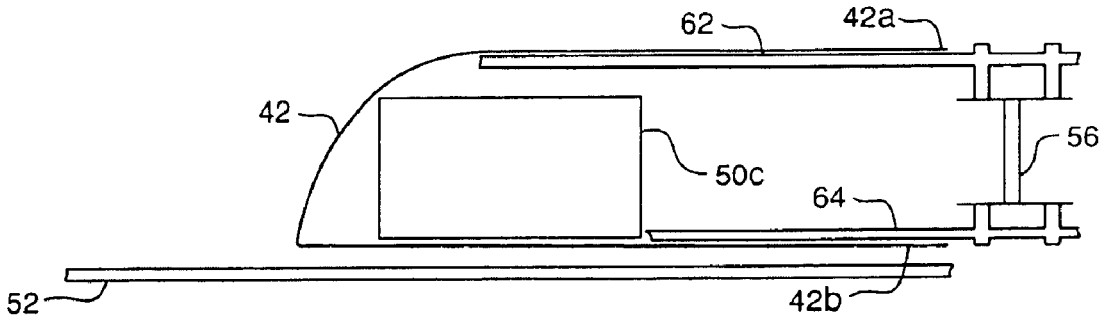
FIG. 7C is an end view of the film being held open by an inverting head to enable a package to enter within the film envelope.
Figure 7D:
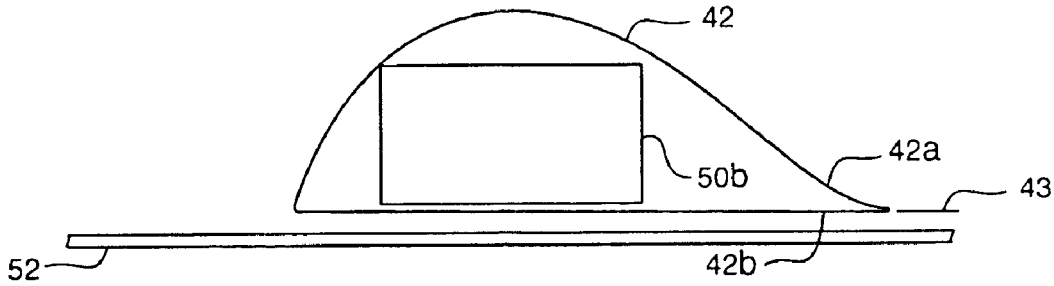
FIG. 7D is an end view of the folded film of FIG. 7C after side sealing a product within the film.

Still referring to FIG. 6 and FIGS. 7A-7D, FIG. 7A shows the thermoplastic film 42 as it comes off the roll 54 with an opening 43 on the left side and a folded side 45 on the right side. FIG. 7B shows the film 42 reversed with the opening 43 on the right side, which is the side that faces the side sealer 10, and the fold 45 on the left side, which is the side facing the package 50. This reversal of the film 42 is accomplished by the film inverting head 56 by draping the film 42 over the film inverting head 56, and arms 62, 64 open the film 42 so that a product 50C coming along the conveyor 52 is enclosed by the film 42 prior to cutting and sealing the upper and lower film edges 42a, 42b as illustrated in FIG. 7C. FIG. 7D shows the film 42 after the film edges 42a and 42b are cut and sealed by the side sealer 10.

This invention has been disclosed in terms of certain embodiment. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for cutting and sealing two layers of film together near an edge of heat-sealable material by a side sealer apparatus comprising the steps of:

*moving said heat sealable material through said side sealer apparatus comprises the steps of* providing a top drive roll spaced-apart from a top idler roll[;] *and* providing a bottom drive roll spaced-apart from a bottom idler roll and positioned [immediately] under said top drive roll and top idler roll respectively[;]

positioning a first pair of spaced-apart [V-belts] *belts* around and between said top drive roll and said top idler roll[;], *and* positioning a second pair of spaced-apart [V-belts] *belts* around and between said bottom [driver] *drive* roll and said bottom idler roll;

[moving said heat sealable material through said side sealer apparatus;]

generating heat to cut and seal near said edge of said heat sealable material with means attached to a bracket suspending said heat generating means in an air space from a frame of said side sealer apparatus, and positioning said heat generating means at a predetermined angle relative to a horizontal plane of said moving means in the path of said heat-sealable material thereby removing excess film;

locating said heat generating means in said air space between said [V-belts] *belts* positioned on an inner side of said heat generating means and said [V-belts] *belts* positioned on an outer side of said heat generating means;

providing an elongated metal sheathed body having an internal heating mechanism *to generate said heat* and a thermocouple[to generate said heat]; and providing closed loop control of said heat generating means in accordance with a predetermined temperature setting with means connected to said [heat generating means] *thermocouple*.

2. The method as recited in claim 1 wherein said step of moving said heat-sealable material through said side sealer apparatus comprises the step of providing thermoplastic film for said heat-sealable material.

3. The method as recited in claim 1 wherein said step of moving said heat sealable material through said side sealer apparatus comprises the step of providing a conveyor *for moving a product surrounded by said heat-sealable material whereby said two layers of film together near an edge of said heat sealable material are moved through said side sealer*.

4. A side sealer apparatus for cutting and sealing two layers of film together near an edge of heat-sealable material comprising:

*means for moving said heat-sealable material through said side sealer apparatus said moving means comprising* a top drive roll spaced-apart from a top idler roll[;] *and* a bottom drive roll spaced-apart from a bottom idler roll and positioned [immediately] under said top drive roll and top idler roll respectively;

a first pair of spaced-apart [V-belts] *belts* positioned around and between said top drive roll and said top idler roll;

a second pair of spaced-apart [V-belts] *belts* positioned around and between said bottom [driver] *drive* roll and said bottom idler roll;

[means for moving said heat-sealable material through said side sealer apparatus;]

means for generating heat to cut and seal said heat-sealable material near said edge thereby removing excess film, said heat generating means being attached to a bracket suspended in an air space from a frame of said side sealer apparatus and positioned at a predetermined angle relative to a horizontal plane of said moving means in the path of said heat-sealable material and located in said air space between said [V-belts] *belts* positioned on an inner side of said heat generating means and said [V-belts] *belts* positioned on an outer side of said [heater] *heat* generating means;

said heat generating means comprises an elongated metal sheathed body including an internal heating mechanism and a thermocouple; and means connected to said heat generating means for providing closed loop control of said heat generating means in accordance with a predetermined temperature setting.

5. The side sealer apparatus as recited in claim 4 wherein said heat-sealable material comprises a thermoplastic film.

[6. The side sealer apparatus as recited in claim 4 wherein said moving means comprises a conveyor.]

7. A side sealer apparatus for cutting and sealing two layers of film together near an edge of heat-sealable material comprising:

a conveyor for moving *a product surrounded by* said [heat-sealable] *heat sealable* material [in contact with] *through* said side sealer apparatus;

*drive belt means for driving said film through said side sealer apparatus comprises* a top drive roll spaced-apart from a top idler roll[;] *and* a bottom drive roll spaced-apart from a bottom idler roll and positioned [immediately] under said top drive roll and top idler roll respectively;

a first pair of spaced-apart [V-belts] *belts* positioned around and between said top drive roll and said top idler roll;

a second pair of spaced-apart [V-belts] *belts* positioned around and between said bottom [driver] *drive* roll and said bottom idler roll; and a heater for generating heat to cut and seal said two layers of film together near the edge of said [sealable] *heat-sealable* material thereby removing excess film, said heater being attached to a bracket suspending said heater in an air space from a frame of said side sealer apparatus [and] *said heater being* positioned at a predetermined angle relative to a horizontal plane of said conveyor in the path of said heat-sealable material and being located between said [V-belts] *belts* positioned on an inner side of said heater and said [V-belts] *belts* positioned on an outer side of said heater;

said heater comprises an elongated metal sheathed body having an internal source of heat and [an internal] *a* thermocouple for sensing a predetermined temperature of said heater; *and* a [heating] controller connected to said heater for providing closed loop control of said heater in accordance with signals from said thermocouple and a predetermined heat setting in said heater controller[; and drive belt means for driving said film through said side sealer].

8. The side sealer apparatus as recited in claim 7 wherein said [sealable] *heat-sealable* material comprises a thermoplastic film.

9. A side sealer system comprising:

a roll of thermoplastic film;

a thermoplastic film inverting head for redirecting said film 90 degrees and turning it inside out;

a conveyor passing by said film inverting head for moving a product within said thermoplastic film;

a side sealer apparatus, located along a side of said conveyor and adjacent to said film inverting head[;], *comprises* a top drive roll spaced-apart from a top idler roll[;], *and* a bottom drive roll spaced-apart from a bottom idler roll[and], *said bottom drive roll being* positioned [immediately] under said top drive roll and top idler roll respectively;

a first pair of spaced-apart [V-belts] *belts* positioned around and between said top drive roll and said top idler roll;

a second pair of spaced-apart [V-belts] *belts* positioned around and between said bottom [driver] *drive* roll and said bottom idler roll;

said side sealer apparatus further [comprising] *comprises* a heater attached to a bracket suspending said heater in an air space from a frame of said side sealer apparatus[and], *said heater being* positioned on said side sealer apparatus at a predetermined angle relative to a horizontal plane of said conveyor and said heater being located in said air space between said [V-belts] *belts* positioned on an inner side of said [heat generating means] *heater* and said [V-belts] *belts* positioned on an outer side of said heater[heat generating means]; *and* said [heater] *side sealer apparatus* comprises a closed loop temperature controller [for cutting and sealing near an edge of said film] *connected to said heater for maintaining said heater* at a predetermined temperature *when cutting and sealing near an edge of said film*, thereby removing excess film[; and said heater comprises an elongated metal sheathed body having an internal source of heat and an internal thermocouple].

10. The side sealer system as recited in claim 9 wherein said film inverting head comprises an upper arm and a lower arm for opening said thermoplastic film to surround a product on said conveyor with said film.

* * * * *

UNITED STATES PATENT AND TRADEMARK OFFICE

CERTIFICATE OF CORRECTION

PATENT NO. : RE43,033 E
APPLICATION NO. : 12/378967
DATED : December 20, 2011
INVENTOR(S) : James et al.

It is certified that error appears in the above-identified patent and that said Letters Patent is hereby corrected as shown below:

In the Claims:

Col. 7, Claim 4, Line 24, after “apparatus”, insert --,--.

Col. 8, Claim 7, Line 11, after “apparatus”, insert --,--.

Col. 8, Claim 7, Line 23, before “drive”, delete --and--.

Col. 8, Claim 9, Line 52, after “inner”, insert --[said]--.

Col. 8, Claim 9, Line 52, “side” should be --*side*-- (italicized).

Signed and Sealed this
Tenth Day of April, 2012

David J. Kappos

David J. Kappos
*Director of the United States Patent and Trademark Office*